J. H. C. BEISSWENGER.
OVAL COMPASS.
APPLICATION FILED MAR. 9, 1918.
1,286,507.
Patented Dec. 3, 1918.
2 SHEETS—SHEET 1.
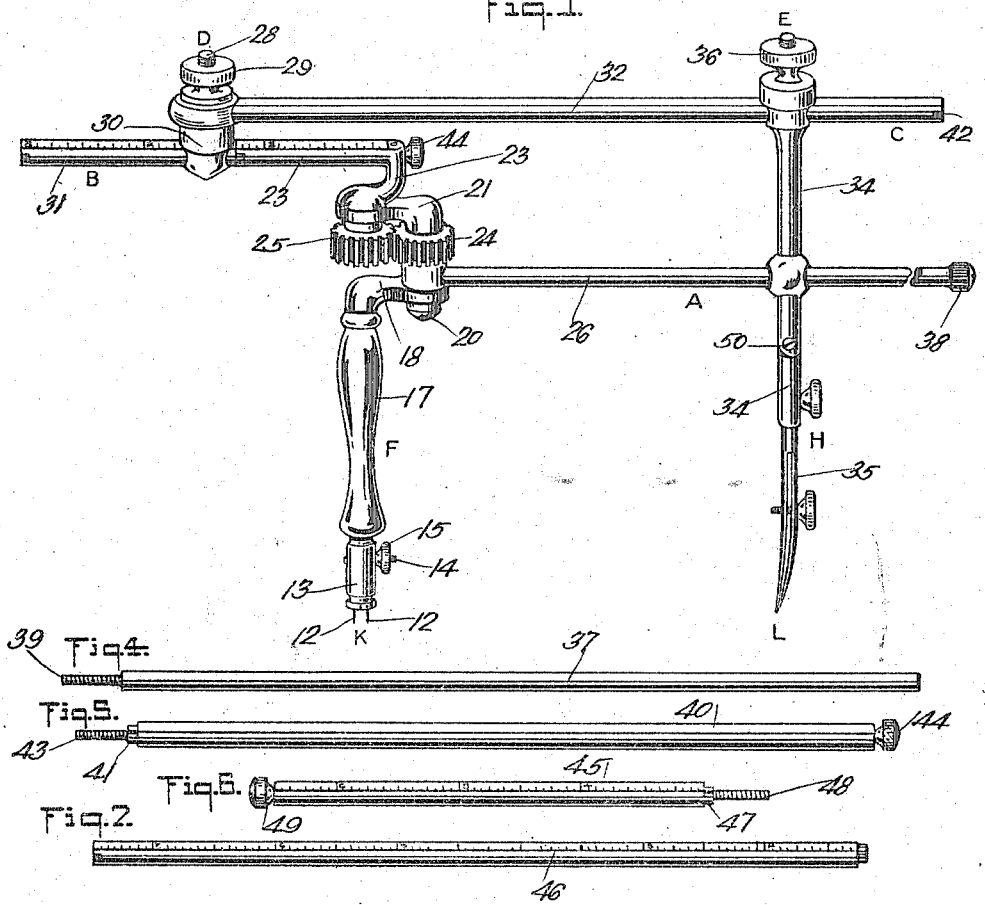
WITNESSES
INVENTOR
J. H. C. Beisswenger
BY
ATTORNEY

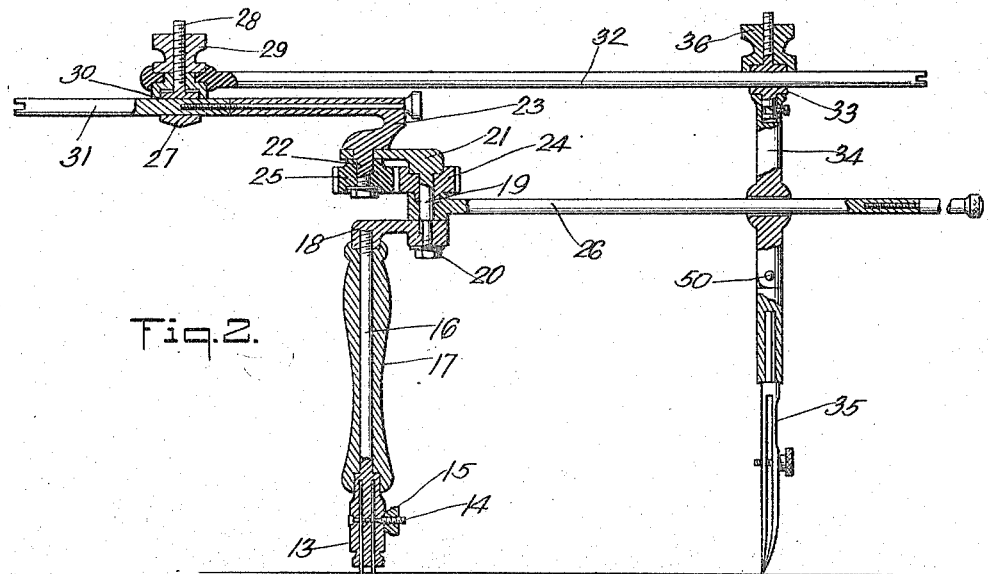
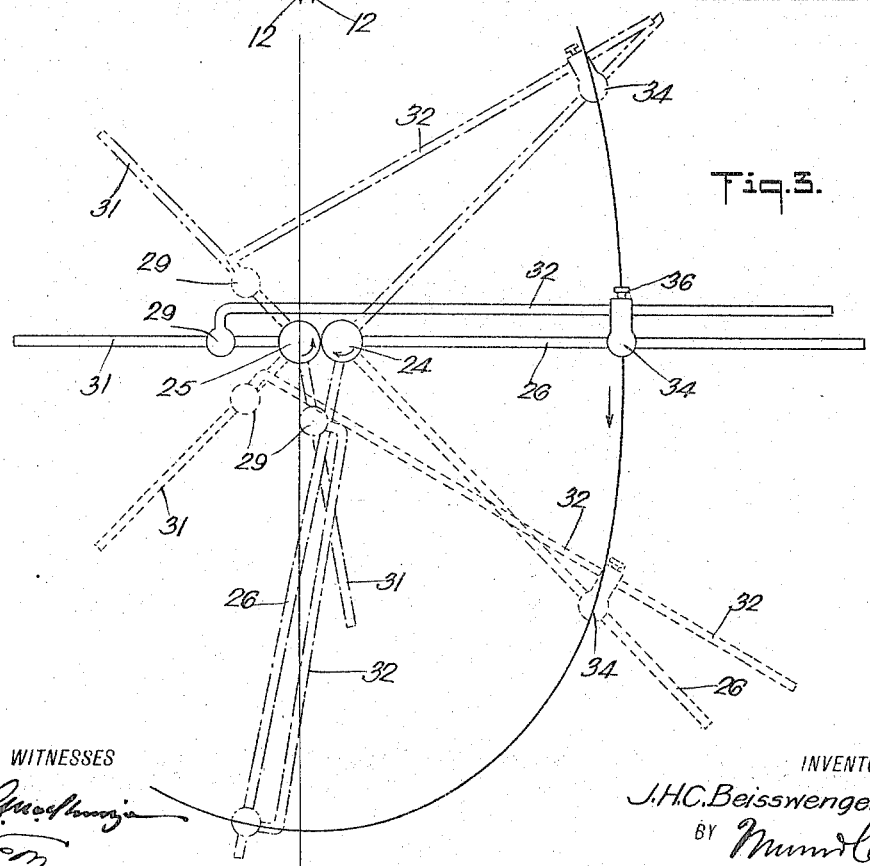

UNITED STATES PATENT OFFICE.

JOHN H. CHARLES BEISSWENGER, OF NEWARK, NEW JERSEY.

OVAL COMPASS.

1,286,507.  Specification of Letters Patent.  Patented Dec. 3, 1918.

Application filed March 9, 1918. Serial No. 221,477.

*To all whom it may concern:*

Be it known that I, JOHN H. CHARLES BEISSWENGER, a citizen of the United States, and a resident of Newark, in the county of Essex and State of New Jersey, have invented a new and Improved Oval Compass, of which the following is a full, clear, and exact description.

Among the principal objects which the present invention has in view are: to provide means for mechanically controlling the path of a marking member for producing an oval outline; to adjust the compass readily; to provide means for varying the range of the marking member; and to simplify the construction of the compass.

Drawings.

Figure 1 is a side view of a compass constructed and arranged in accordance with the present invention;

Fig. 2 is a longitudinal section of the same, the section being taken on the median plane of the instrument;

Fig. 3 is a schematic view showing in plan, three positions of the compass and a portion of an oval outlined thereby;

Fig. 4 is a side view of an extension bar for the operating beam of the compass;

Fig. 5 is a side view of an extension link for the adjusting beam of the compass;

Figs. 6 and 7 are extension bars for the scale bar of the compass.

Description.

As seen in the drawings, a pivot post is provided, which has two prick points 12 carried in a chuck 13. The chuck 13 has sockets bored lengthwise thereof and a perforation bored transverse thereof, the center of said perforation being alined with the centers of said sockets. Movably mounted in the perforation is a screw-threaded perforated pin 14, the perforations in said pin being adapted to have extended therethrough, said prick points.

Engaging the threaded extension of the pin 14, is a nut 15, which when manipulated crowds upon the chuck 13 and draws the pin 14 so that said pin impinges on the pin points to clamp the same rigidly in adjusted position. The chuck 13 is preferably integrally formed with a handle bar 16. The bar 16 has a covering hand grip 17, which is held between the chuck 13 and the end of an offset 18 with which the said bar is engaged, by means of a tapped socket formed in said offset. The offset 18 is structurally united by means of a stud shaft 19 and clamping nut 20, with a bracket arm 21. The bracket arm 21 is perforated adjacent the end thereof to hold the stud shaft 22 formed at the inner end of the adjusting arm 23.

The stud shafts 19 and 22 serve as pivotal mountings for the meshed gear wheels 24 and 25, respectively. The gear wheel 24 is rigidly attached to the hub of a manipulating rod 26, while the gear wheel 25 is rigidly attached to the stud shaft 22 and arm 23. The wheel 25 is held in structural relation to the arm 23 by means of a screw nut.

The arm 23 is slidingly engaged by a loop head 27 in the end of a screw 28. The screw 28 is engaged by a nut 29, which may be manipulated to force the edges of a cup washer 30 on the top of the arm 23 or extension rods 31 with which the said arm 23 is associated in service.

Rotatively connected with the cup washer 30 and nut 29, is a link bar 32. The link bar 32 extends through the perforation in a pivot block 33, which block is pivotally mounted in the top of a handle 34 of the pen of a marking member 35. The member 35 has a transverse bore through which the manipulating bar 36 freely moves. It is obvious that the pen shown in the drawings may be replaced by any desired marking tool or member.

When the device is constructed as shown in the drawings and as above described, the operation is as follows:

The marking member 35 and handle 34 connected therewith, is adjusted on the link 32, after the said link 32, arm 23, and rod 26 have been disposed in superposed arrangement and in the same plane. The variation between the short and the long axes of the instruments is arrived at and provided for by loosening the nuts 29 and 36 to permit sliding of the loop head 27 and pivot block 33 on the arm 23 and link bar 32, respectively. The loop head 27 is then moved the required distance on the arm 23 or rod 31, from the center of the handle bar, which coincides with the center of the oval to be completed. The adjustment of the loop head 27 on the arm 23 is, of course, equal to the shorter radius of the oval. Having made the adjustment, the nuts 29 and 36 are tightened to hold the loop 27 and head 33 immovable on the arm 23 and rod 32, respectively. It will be observed that the spread pin points 12 prevent the rotating of the handle bar 16, offset 18, bracket arm 21 and parts connected therewith. These members remain throughout the operation relatively fixed. The operator then grasps the manipulating rod 26 and places the end of the marking instrument on the paper. The handle 26 is moved around the points 12, rotating the wheel 24 on the stud shaft 19. The wheel 24 being meshed with the wheel 25, rotates the latter, together with the arm 23 connected therewith, but in the rotary direction the reverse of that followed by the wheel 24. As shown in Fig. 3, the gyrations of the manipulating rod 26 and the arm 23 are in relatively opposite directions so that the two approach, the rod 26 passing under the wheel 25 and arm 23.

The arm 23 and extension rod 31 connected therewith reverse their positions relation to the link 32. That is to say, reverse the end for end positions. The loop head 27 passes through a position wherein said loop head is intermediate the handle 34 and handle bar 16. It is obvious that as the loop head assumes the last-mentioned position, the removal of the marking member 35 from the prick points 12, is farther extended, while when the loop head 27 is in the position shown in Fig. 1 where the handle bar 16 is intermediate the loop head and marking member, the said marking member is nearest the prick points. These two positions correspond with the long and short radii of the oval.

In Figs. 4 to 7, inclusive, a number of extension bars has been shown. The bar 37 is connected with the manipulating rod 26, the milled-head screw 38 being removed from the tapped perforation in the end of the rod 26 to receive the threaded extension 39 of the bar 37. At the end of the bar 37, a corresponding tapped hole is formed to receive the shank of the milled-head screw 38.

In Fig. 5, the bar 40 corresponds in cross section with the link 32 and is provided with fins 41, which fit recesses 42 in the end of the link 32. At the bottom of the recesses 42, a tapped hole is provided to receive the threaded end 43 of an elongated screw which extends through the full length of the bar 40 and has a milled head 44.

In Figs. 6 and 7, extension bars 45 and 46 are shown. These are calibrated to correspond with the arm 23 and bar 31. The bars 45 and 46 are held in operative position by fins 47 formed at the ends thereof and by elongated screws 48 having each a milled head 49. To permit the adjusting of the marking member, the handle 34 is furnished with a pivot or breaking joint 50.

Claims.

1. A compass as characterized comprising a non-rotative center post; a wheel rotatively mounted upon said post and concentric therewith; a marking member; an articulated connection between said member and said wheel for moving said member toward and away from said wheel in correspondence with the rotation of said wheel; and means connected with said member for manually moving the same, said means operating to rotate said wheel.

2. A compass as characterized comprising a pivot post; means for non-rotatively mounting said post on a drawing; a gear wheel rotatively connected with said post in concentric relation thereto; an offset bracket bearing rigidly connected with said post; a transmission gear wheel rotatively mounted on said bearing and operatively engaging the first-mentioned gear wheel; a manipulating rod operatively connected with said transmission gear wheel; a marking member slidably mounted on said manipulating rod; a crank arm rigidly connected with said first-mentioned gear wheel; and a link operatively connecting said marking member and said crank arm.

3. A compass as characterized comprising a rigid center post; means for disposing the same non-rotatively on a drawing; an offset bearing bracket rigidly mounted on said post; a rotary member disposed in concentric relation to said post; a manipulating bar rotatively connected with said bracket eccentric to said post; an adjusting bar rotatively mounted on said bracket concentric to said post; means operatively connecting the pivot mountings of said manipulating bar and said adjusting bar for rotating the same in relatively reverse rotary directions; a marking member slidably mounted on said manipulating bar; a link movably connected with said adjusting bar and said marking member; and means for fastening said link relative to said adjusting bar and to said marking member.

JOHN H. CHARLES BEISSWENGER.

Copies of this patent may be obtained for five cents each, by addressing the "Commissioner of Patents, Washington, D. C."